United States Patent
Sullivan et al.

(10) Patent No.: US 11,514,232 B2
(45) Date of Patent: Nov. 29, 2022

(54) MULTI DIMENSIONAL RULES-BASED DYNAMIC LAYOUTS

(71) Applicant: Oracle International Corporation, Redwood Shores, CA (US)

(72) Inventors: Blake Sullivan, Redwood City, CA (US); Naizam Olakara, Santa Clara, CA (US); Kentaro Kinebuchi, San Francisco, CA (US); Jing Wu, Foster City, CA (US); Min Lu, Fremont, CA (US); Maria Kaval, Menlo Park, CA (US); Christian Straub, Palo Alto, CA (US)

(73) Assignee: Oracle International Corporation, Redwood Shores (CA)

( * ) Notice: Subject to any disclaimer, the term of this patent is extended or adjusted under 35 U.S.C. 154(b) by 125 days.

(21) Appl. No.: 16/439,371

(22) Filed: Jun. 12, 2019

(65) Prior Publication Data

US 2020/0110793 A1 Apr. 9, 2020

Related U.S. Application Data

(60) Provisional application No. 62/741,132, filed on Oct. 4, 2018.

(51) Int. Cl.
*G06F 3/0484* (2022.01)
*G06F 40/14* (2020.01)

(52) U.S. Cl.
CPC ............ *G06F 40/14* (2020.01); *G06F 3/0484* (2013.01)

(58) Field of Classification Search
CPC .......... G06F 40/14; G06F 3/0484; G06F 8/38
See application file for complete search history.

(56) References Cited

U.S. PATENT DOCUMENTS

| | | | |
|---|---|---|---|
| 2004/0056894 A1* | 3/2004 | Zaika | G06F 9/454 715/762 |
| 2011/0296373 A1* | 12/2011 | Calev | G06F 9/45512 717/104 |
| 2012/0137227 A1* | 5/2012 | Gerken, III | G06F 8/38 715/747 |
| 2012/0167041 A1* | 6/2012 | Payzer | G06F 8/38 717/113 |
| 2012/0304150 A1* | 11/2012 | Leithead | H04L 63/04 717/115 |
| 2015/0089403 A1* | 3/2015 | Zhu | G06F 8/38 715/762 |
| 2016/0070813 A1* | 3/2016 | Unter Ecker | G06F 8/38 715/234 |

(Continued)

*Primary Examiner* — Phenuel S Salomon
(74) *Attorney, Agent, or Firm* — Trellis IP Law Group, PC

(57) ABSTRACT

An example method facilitates modification and generation of User Interface (UI) display screens for webpages and web applications, such as process-based software applications. The example method includes receiving a first signal to access a webpage that includes a static UI display screen for a web application; serving the webpage in response to the signal; detecting the dynamic configuration functionality associated with the webpage, wherein the configuration functionality includes code and UI metadata provided in or with a dynamic layout file, the code and UI metadata including one or more rules and specifications for configuring schema used to generate rendering instructions for the dynamic part of the webpage.

25 Claims, 8 Drawing Sheets

(56) References Cited

U.S. PATENT DOCUMENTS

2018/0046609 A1\* 2/2018 Agarwal ................ G06F 40/186
2018/0052808 A1\* 2/2018 Wan ........................ G06F 40/14
2019/0065440 A1\* 2/2019 Lu ........................ G06F 9/44526

\* cited by examiner

MULTI DIMENSIONAL RULES-BASED DYNAMIC LAYOUTS

CROSS REFERENCES TO RELATED APPLICATIONS

This application claims the benefit of U.S. Provisional Patent Application Ser. No. 62/741,132, entitled MULTI DIMENSIONAL RULES-BASED DYNAMIC LAYOUTS, filed on Oct. 4, 2018, which is hereby incorporated by reference as if set forth in full in this application for all purposes.

BACKGROUND

The present application relates to computing and more specifically to systems and methods for facilitating customizing or adapting User Interface (UI) display screens in accordance with rules or other preferences.

Systems and methods for customizing UI display screens are employed in various demanding applications, including webpage customization tools, tools for customizing enterprise applications for different enterprises, and so on. Such applications often demand efficient and versatile mechanisms for enabling rapid and accurate configuration and customization of software UIs to meet the needs of different, and often changing, scenarios.

Conventionally, customization tools for adjusting enterprise application UIs often required changing of underlying application source code. However, this can be tedious. Furthermore, modifying underlying source code can be particularly problematic when enterprises are to share the same underlying source code for the purposes of implementing a particular enterprise software application.

SUMMARY

An example method facilitates configuration of a dynamic User Interface (UI) model and associated dynamic UI display screens (e.g., for a client-side application or web application) and includes receiving metadata describing one or more features of a UI display screen to be generated; using a layout software module (also called layout file herein) to determine and configure the UI display screen in accordance with the metadata and one or more configurable rules set forth in the software, resulting in a description of the UI display screen, wherein the description is sufficient to generate the UI display screen, which may be populated with underlying data from one or more data objects; receiving an adjustment to code of the layout software module; and automatically adjusting the description of the UI display screen at runtime, resulting in an updated UI display screen description based on the adjustment to the code, while a web application that uses the UI display screen is running.

In a more specific embodiment, the step of using further includes forwarding the description of the UI display screen to a real-time UI display screen generator. The real-time UI display screen generator includes code for employing the updated UI display screen description to generate markup and rendering instructions for a corresponding updated UI display screen.

The layout software module acts as a layer of abstraction over (or encapsulating) one or more files containing metadata describing the updated UI display screen, wherein the layer of abstraction facilitates user (e.g., developer) control over appearance of the updated UI display screen. The appearance of the updated UI display screen is controlled, in part, by the layout software module, which specifies one or more UI layouts to apply to one or more sections of the UI display screen.

The step of using may further include selecting one or more sets of UI display screen layouts (e.g., styles) to apply to the one or more UI features in accordance with the one or more configurable rules. Code for the layout software module is included in a dynamic layout file, which may be implemented using JavaScript.

The one or more features may include, for example, one or more UI display screen components, such as one or more UI controls. The one or more UI display screen components may further include one or more UI display screen sections, e.g., corresponding to a table, form, or nested versions thereof (e.g., a table in a form, or a form in a table, a table in a table, a form in a form, etc.).

The example method may further include receiving, at the layout software module, metadata from a Swagger file (or equivalent), which is also called a schema file herein. The metadata from the Swagger file may act as a plugin to the layout software module. The layout software module includes code for selectively accepting or including one or more portions of the metadata from the Swagger file.

The metadata from the Swagger file may include, for example, information describing viewer roles and associated privileges; a specification of one or more attributes of one or more UI controls of the updated UI display screen. The one or more UI controls may include, for example, a field or drop-down menu in a table or form. The one or more attributes may include, for example, text formatting, e.g., text color, date format, etc.

The metadata may include, for example, one or more of the following: a specification of one or more business objects to represent via one or more sections of the updated UI display screen, the one or more sections including one or more forms or tables; a business object path for the one or more business objects, wherein the business object path indicates a use context for a business object in relation to one or more other business objects; a declaration of usage of the one or more business objects; a description of one or more viewer roles and associated privileges; one or more polymorphic variants of the one or more business objects in accordance with one or more predetermined data discriminants; metadata obtained from a metadata service provider via a Swagger file or equivalent; and so on. The example method may further include providing the metadata, contained in the updated UI display screen description, to a real-time UI display screen generator for generation of rendering instructions for the updated UI display screen.

Hence, certain embodiments disclosed herein provide substantial flexibility for users (e.g., developers) to reuse layouts and associated rules in similar or different UI display screens that require similar dynamic forms or tables. Conventionally, tedious hand coding and repeating of format specifications, etc., may otherwise be required.

Furthermore, use of dynamic layout files discussed herein can readily support different use cases, without resulting in performance degradation and excessive upgrade issues, as plagued certain conventional approaches to dynamic UI configuration and updating.

In addition, the dynamic layout files enable efficient specification, configuration, and application for rules for UI models and associated display screens. For example, different types of layouts or styles can be efficiently applied to different UI display screen components and sections based on whether or not certain conditions are met. For example, layouts applied to different UI display screen sections and their associated layouts or styles may be a function of the current role of the logged in user; the particular device employed by the user to log in, and so on.

Use of the dynamic layout file as discussed herein also facilitates specification of the order in which UI components appear; style of a given certain component, whether or not to show/hide a component, and so on. The dynamic layout files and associated information and rules can be saved in a backend database and available for client fetching (via REpresentation State Transfer (REST) calls) at run time from a server that communicates with the backend database. Fetched dynamic layout files may be returned in the form of a multi-part (Multipurpose Internet Mail Extensions) response containing base layout information along with multiple extensions (e.g., extensions for adding layouts, rules, new uses, etc.).

A further understanding of the nature and the advantages of particular embodiments disclosed herein may be realized by reference of the remaining portions of the specification and the attached drawings.

DETAILED DESCRIPTION OF EMBODIMENTS

Figure 1:
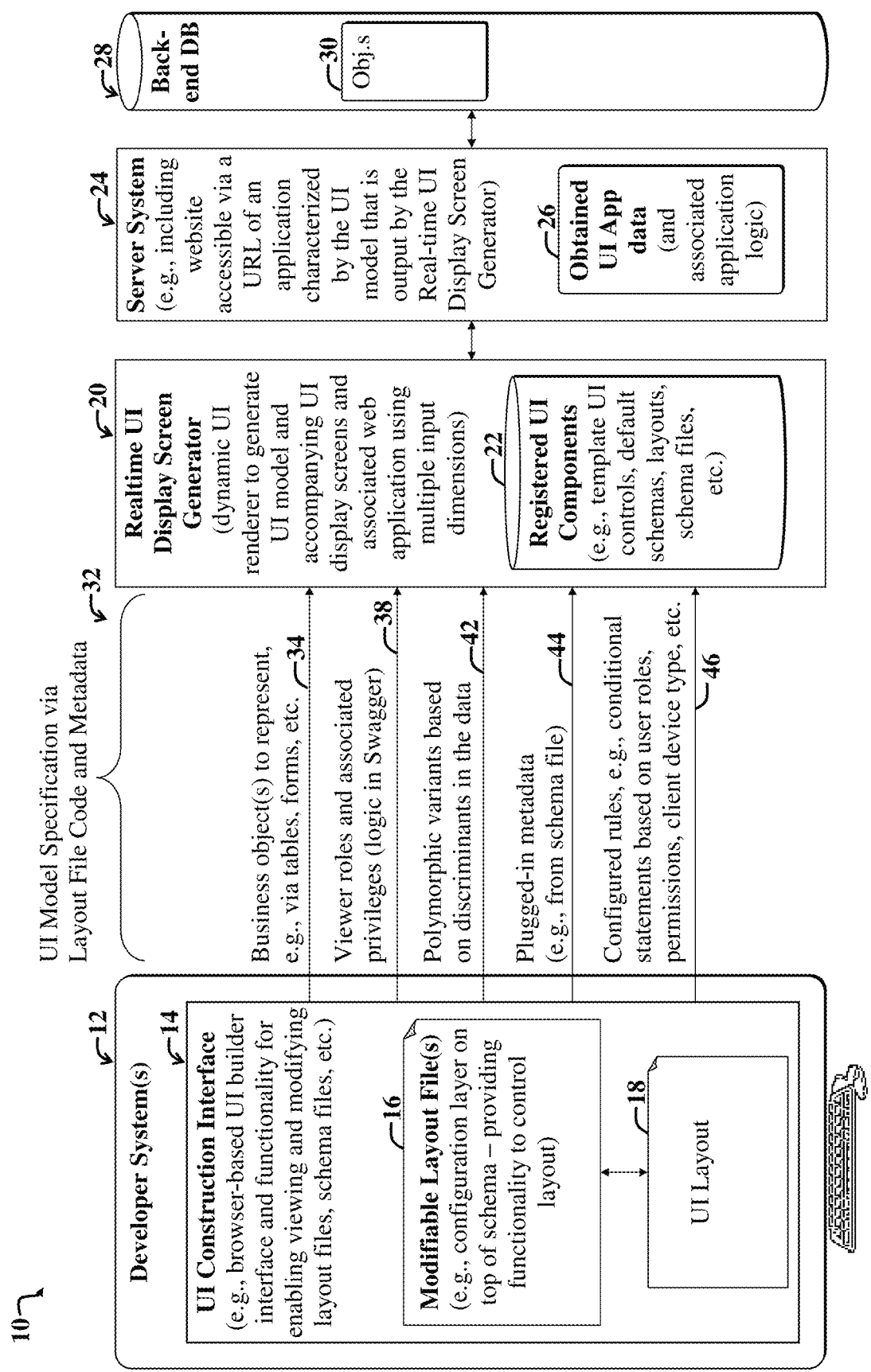
FIG. 1 is a block diagram showing a first example system and accompanying computing environment for facilitating use of one or more modifiable layout files to selectively control and efficiently update one or more dynamic UI display screen features for a web application, e.g., by facilitating changing or configuring rules for applying different layouts or styles to different UI display screen sections in accordance with modifiable conditions.

For the purposes of the present discussion, a computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices, servers, and so on.

An enterprise computing environment may be any computing environment used for a business or organization. An example enterprise computing environment includes various computing resources distributed across a network and may further include private and shared content on Intranet Web servers, databases, files on local hard discs or file servers, email systems, document management systems, portals, and so on.

A given software application may include (but not necessarily) constituent software applications or modules (e.g., services, functions, procedures, computing objects, etc.). Accordingly, the term "software application" may also include networked software applications or integrated groups thereof.

A software system may be any collection of computing resources implementing machine-readable instructions, i.e., computer code. Accordingly, the term "software system" may refer to a software application, and depending upon the context in which the term is used, may further refer to the accompanying computer(s) and associated computing resources used to run the software application.

Depending upon the context in which the term is used, a software system may further include hardware, firmware, and other computing resources enabling running of the software application. Note that certain software systems may include collections of disparate services, which are implemented in particular sequences in accordance with a process template and accompanying logic. Accordingly, the terms "software system," "system," and "software application" may be employed interchangeably herein to refer to modules or groups of modules or computing resources used for computer processing.

Systems integration may refer to the establishment of communications between systems, e.g., software systems. When software systems to be integrated include enterprise applications, the integration process may be called Enterprise Application Integration (EAI). When the software systems run on a cloud (e.g., a collection of one or more networked server systems), then integration of the software systems may be called Cloud Application Integration (CAI). Note that embodiments discussed herein are not necessarily limited to a particular type of computing environment or types of software systems being integrated.

For clarity, certain well-known components, such as hard drives, processors, operating systems, power supplies, routers, Internet Service Providers (ISPs), virtual machines, middleware, JavaServer Faces (JSF) frameworks and servlets, certain types of metadata service providers, runtime service connectors, persistence managers, metadata transformation utilities, authentication modules, identity providers, token validators, and so on, are not necessarily explicitly called out in the figures. However, those skilled in the art with access to the present teachings will know which components to implement and how to implement them to meet the needs of a given implementation.

FIG. 1 is a block diagram showing a first example system 10 and accompanying computing environment for facilitating use of one or more modifiable layout files 16 to selectively control and efficiently update one or more dynamic UI display screen features (of the generated UI and application 26) for a web application, e.g., by facilitating changing or configuring rules for applying different UI layouts 18 or styles to different UI display screen sections (e.g., corresponding to tables, forms, etc., which may represent objects, i.e., collections of data) in accordance with user modifiable conditions defined by the rules. Note that the obtained UI application 26 may be downloaded and installed on a client device and run as a mobile application used to display UI display screens in accordance with the modifiable layout files, schema files, and any object data used to populate fields or sections of the UI display screens, as discussed more fully below.

Note that in general, groupings of various modules of the system 10 are illustrative and may vary, e.g., certain modules may be combined with other modules or implemented inside of other modules, or the modules may otherwise be distributed differently (than shown) among a network or within one or more computing devices or virtual machines, without departing from the scope of the present teachings. For example, while the layout files 16 and associated UI layout 18 are shown displayed client-side on a developer system 12, that in practice, the files 16, 18 may be stored server-side and selectively accessed by a client-side UI construction interface 14.

Furthermore, in alternative implementations the real-time UI display screen generator 20 may be hosted on the server system 24 (e.g., as opposed to a user's client system), which may include one or more web servers hosting websites, and application servers responding to web application calls from applications hosted on the web server. The application server may access a backend database 28 to selectively retrieve and/or store data for web applications.

In addition, while registered UI components 22 and associated identifications, descriptions, and so on, are shown as part of a real-time UI display screen generator 20, that the registered components 22 may be maintained elsewhere, e.g., the backend database 28, and selectively retrieved as needed by the real-time UI display screen generator 20.

For the purposes of the present discussion, a UI display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

The client-side UI construction interface 14 may include a browser used to browse to a site hosting software functionality that backs the UI construction interface 14. For the purposes of the present discussion, software functionality may be software functionality may be any function, capability, or feature, e.g., stored or arranged data, that is provided via computer code, i.e., software. Generally, software functionality may be accessible via use of a user interface and accompanying user interface controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

The developer systems 12 and accompanying UI construction interface 14 communicate with a real-time UI display screen generator 20, which may include or represent a dynamic UI renderer. The real-time UI display screen generator 20 includes code for generating dynamic UI rendering instructions describing a UI model and accompanying UI display screens and associated web application using multiple input dimensions, called UI metadata 32 herein.

The multiple input dimensions 32 include UI metadata (e.g., data describing one or more features of a UI display screen), including any specification or implementation of rules implemented via the one or more modifiable layout files 16. The rules may specify, for example, to apply a particular layout or style to a table or a form if a certain condition is met, e.g., in accordance with user role, job title, access permissions, device being used, and so on.

Note that the modifiable layout files 16 may represent JavaScript files, i.e., programs that act as a control layer or abstraction layer over the UI schema, providing functionality to control the UI layout 18. The UI schema files may represent data (e.g., definitions) that can be selective plugged into the modifiable layout files 16, e.g., via code specified in the modifiable layout files 16. For example, code in a modifiable layout file 16 can specify to include all or a portion of the metadata from a particular schema file in the dynamic UI display screen to be generated.

The input dimensions and metadata 32 used to drive construction of the UI and application 26 (which may be, for example, a process-based software application) may also include attributes describing UI control formatting, e.g., the color of text in a drop-down menu control, or the formatting of a date in a field.

Examples of input dimensions describing a UI to generate include business objects to represent 34 (e.g., via tables, forms, etc.); viewer roles and associated privileges 38 (which may be obtained from schema files); polymorphic (occurring in different manifestations or versions) variants 42 of objects or associated UI features based on discriminants in the object data; plugged-in metadata 44 (e.g., plugged in from a Swagger file or from another source or mechanism, e.g., via a format delivered via a metadata service provider); and configured rules 46 (e.g., conditional statements based on user roles, permissions, client device type, etc.).

The input dimensions 32 are input to the real-time UI display screen generator 20, which references the descriptive data 32 describing the UI to generate and the available registered UI components 22, which may be referenced in the data 32, e.g., via code in the modifiable layout file(s) 16. In the present example embodiment, the registered UI components 22 further include registered layouts (e.g., to apply to different UI sections, e.g., tables, forms, etc.), UI controls, default schema files, and so on. Such registered components 22 may act as templates which can be called up or employed via code in the modifiable layout file(s) 16 to inform the real-time UI display screen generator 20 as to how a particular UI page should be rendered.

Once the described UI display screen and/or accompanying Document Object Model (DOM) and schema have been generated, and rules specified in the modifiable layout file(s) 16 for the UI display screen(s) have been incorporated, the resulting UI display screens and associated logic (including rules specified in the layout file(s)) are implemented.

Note that the UI may communicate with one or more data objects 30 maintained in a backend database 28. For example, data (e.g., objects 30) for a particular UI display screen may be retrieved from the backend database 28 via an application server that obtains the UI app data 26 and provides it to a client device implementing the real-time UI display screen generator 20.

Figure 2:
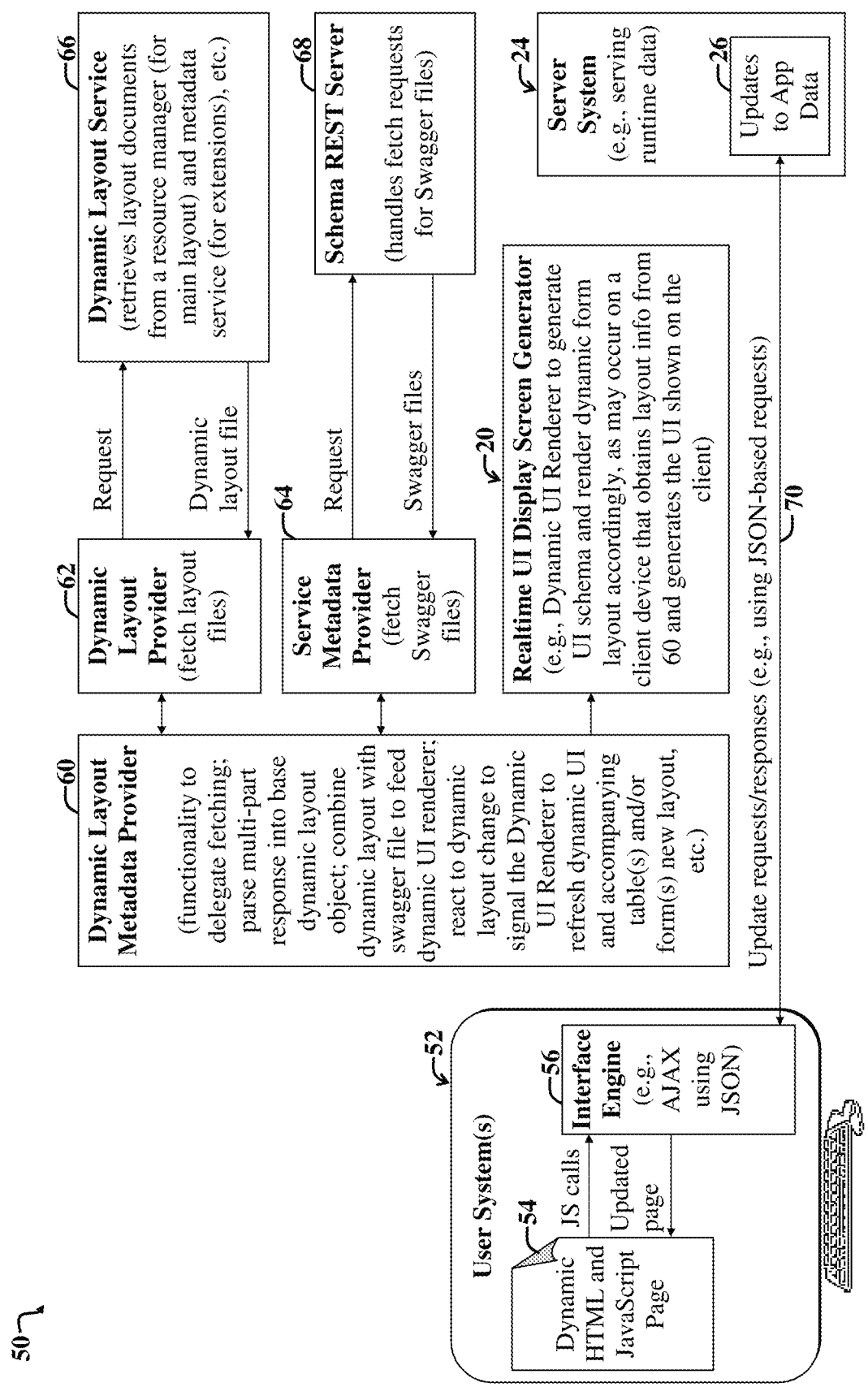
FIG. 2 is a block diagram showing a second example system and accompanying computing environment that further illustrates example retrieval of configured dynamic layout files and swagger files from backend servers to facilitate dynamic UI display screen generation and use.

FIG. 2 is a block diagram showing a second example system 50 and accompanying computing environment that further illustrates example retrieval of configured dynamic layout files and swagger files from backend servers 66, 68 to facilitate dynamic UI display screen generation by the real-time UI display screen generator 20 (which may be implemented on the user systems 52, despite being shown separately from the user systems 52 in FIG. 2).

In the second example embodiment 50, a developer has made adjustments to a dynamic layout file (and/or associated Swagger file, i.e., schema file), e.g., via use of functionality provided by a dynamic layout service server 66 (which may also provide an application development environment), so as to change the associated UI display screen during runtime. The updated dynamic layout file has been saved to the dynamic layout service server 66. The updated Swagger file has been saved to a backend schema REST server 68.

During runtime, a dynamic layout metadata provider 60 employs a dynamic layout provider 62 to retrieve the dynamic layout file from the dynamic layout service 66. The dynamic layout service in turn retrieves layout documents from a resource manager (for main layout) and a metadata service (for extensions), which are not shown in FIG. 2. Similarly, the dynamic layout metadata provider 60 employs a service metadata provider 64 to fetch the updated Swagger file 68 from the schema REST server 68.

Accordingly, the dynamic layout metadata provider 60 includes code and associated functionality to delegate fetching; parse multi-part MIME response into base dynamic layout object; selectively combine the dynamic layout file with the Swagger file (to feed to the dynamic UI renderer 20); dynamically react to layout changes by signaling the real-time UI display screen generator 20 to refresh the dynamic UI and accompanying table(s) and/or form(s) and to incorporate any new layouts or styles as specified in the updated metadata retrieved from the dynamic layout provider 62 and service metadata provider 64.

Once the real-time UI display screen generator 20 generates and publishes the updated UI display screens and/or data 26, the user systems 52 may immediately see a change in associated UI display screens rendered in the browser of the user systems 52 (i.e., user client devices). Note that in certain implementations, the Real-time UI display screen generator 20 is implemented on the client device (e.g., one or more of the user systems 52). In such cases, the client obtains schema and layout information (e.g., via service calls) from the dynamic layout metadata provider 60 and then generates the UI that is shown to the user based on the obtained information.

For completeness, the browser of the user systems 52 is shown including a dynamic HTML page and accompanying JavaScript. When the user interacts with the page 54, events are detected by the JavaScript (e.g., by referencing a DOM generated by the browser for the page 54), and associated calls are passed to an interface engine 56. The interface engine 56 may be implemented as an AJAX (Asynchronous JavaScript and XML) engine that employs JavaScript Object Notation (JSON) (as opposed to XML) for communicating with the server system 24.

Note that in the present example embodiment, the UI is rendered on the client 52, i.e., a web server is not needed to render (i.e., generate rendering instructions) the dynamic UI form/table. The server system 24 serves the actual runtime data for use by the client device 52, and need not serve the actual UI rendering instructions.

The interface engine 56 includes code for processing the JavaScript calls and forwarding corresponding data and/or page requests to the server system 24 and updated data 26. The requests are processed by the server system 24 and accompanying code, and then passed back to the interface engine 56, which then provides the updated page data 54 to the viewer.

Note that, the dynamic layout service server 66 provides both design time and runtime support for embodiments discussed herein. For example, during design time, the dynamic layout service 66 may provide a quick start guide for developers creating an initial application. The quick start guide may provide options enabling the developer to pick from among available fields to show; in what order to show the fields in the UI display screen, and so on.

The quick start guide may also provide example conditions and provide support for expressions. For example, a developer may only wish to show a particular field if the logged in user has administrator privileges. dynamic layout service expression controls may facilitate specifying such conditions.

The dynamic layout service 66 may also provide developers with visual feedback as to how certain layouts will appear when applied to different data objects and when extension files are added on top of the base code and associated layout files.

The dynamic layout service 66 may also provide namespace support. For example, the UI of a base application can be customized by a given customer by adding custom extensions that can be used with layout files and schema files. But, different customers or enterprises may use extension files with similar names. The namespace support provided by the dynamic layout service 66 can help to prevent namespace collisions and facilitate support for multiple extensions. Any changes to backend dynamic layout files, schema files, extensions, etc., will be automatically refreshed, pushed to the client application (also called client software application, which may correspond to the page 54 and interface engine 56 of the user systems 52 of FIG. 2, when the page 54 and interface engine 56 are used to display output from the realtime UI display screen generator 20) and/or pulled by the client application from the backend servers (e.g., servers 62-68) via the dynamic layout metadata provider 60.

In summary, the dynamic layout metadata provider 60 pull any developed layout files, as needed, from the dynamic layout service 66 via the dynamic layout provider 62. The dynamic layout metadata provider 60 also pulls any requisite schema file(s) from the backend schema REST server 68 via the service metadata provider 64. Recall that a schema file (also called Swagger file) returned from the schema REST server 68 represents the definition of an object of a particular type, where the definition specifies the full characteristics of what an object may exhibit (but note that an instance of the object of the particular type may exhibit fewer characteristics than the full characteristics).

The retrieved schema files and layout files are then combined by the dynamic layout metadata provider 60 and provided, in realtime (or near realtime) to the realtime display screen generator 20. The real-time UI display screen generator 20 then uses the combined information to render a UI display screen with an associated dynamic form, table, list, etc.

Figure 3:
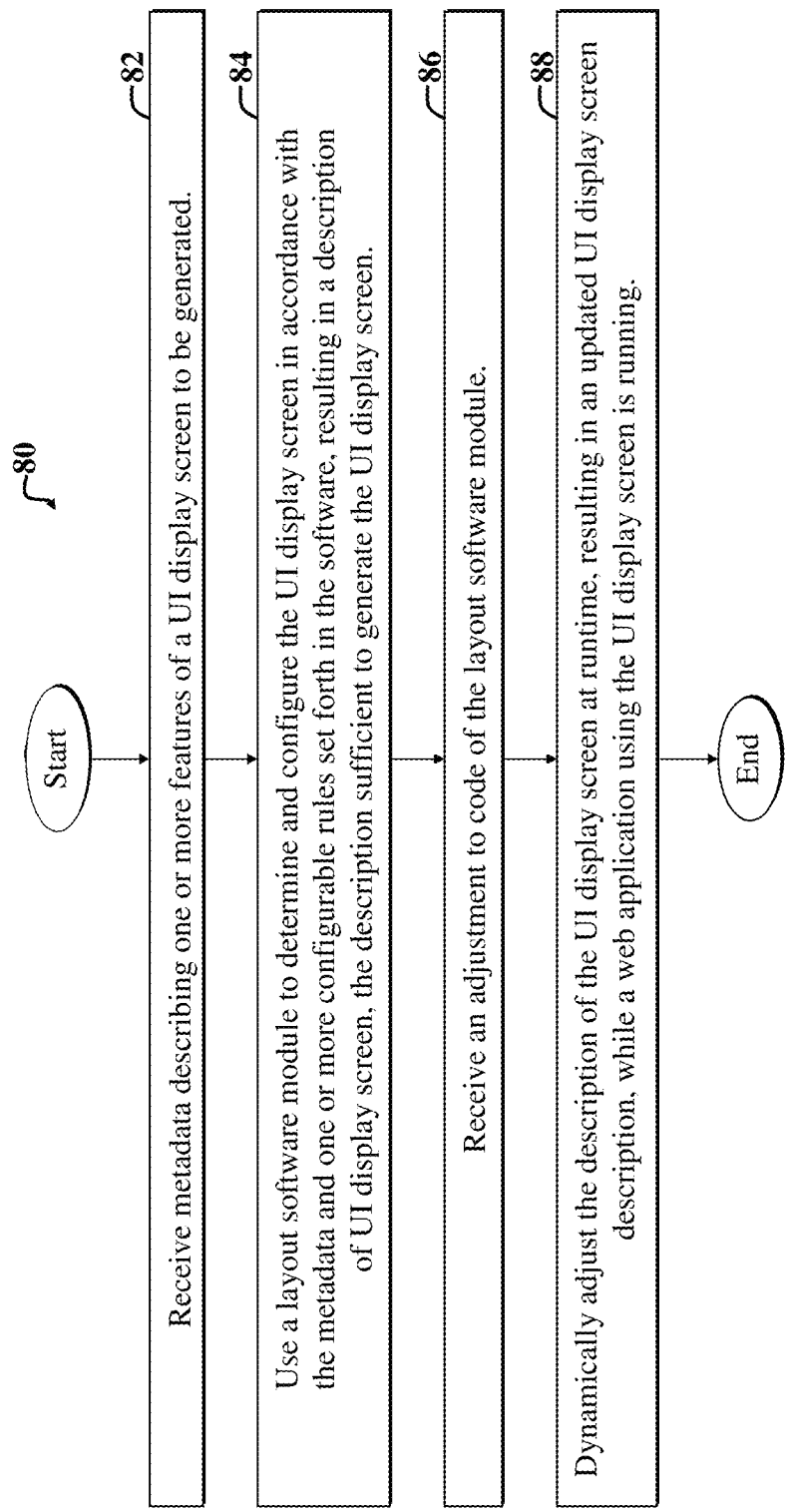
FIG. 3 is a flow diagram of a first example method usable with the embodiments of FIGS. 1-2.

FIG. 3 is a flow diagram of first example method 80 usable with the embodiments of FIGS. 1-2. The example method 80 facilitates configuration of a UI model and associated UI display screens for a web application.

A first step 82 includes receiving metadata, e.g., the metadata 32 shown in FIG. 1, describing one or more features of a UI display screen to be generated.

A second step includes using a layout software module (e.g., represented by the file(s) 16 of FIG. 1) to determine and configure the UI display screen in accordance with the metadata, e.g., including metadata obtained from a schema file and one or more configurable rules set forth in the software, resulting in a description of the UI display screen, the description sufficient to generate the UI display screen. The description may be represented by the collection of input dimensions 32 of FIG. 1, which may correspond to the output of the dynamic layout metadata provider 60 of FIG. 2.

A third step 86 includes receiving an adjustment to code of the layout software module. With reference to FIG. 2, the dynamic layout metadata provider 60 may receive adjustments to layout files and associated Swagger files from the backend servers 66, 68.

A fourth step 88 includes automatically adjusting the description of the UI display screen at runtime, resulting in an updated UI display screen description (e.g., as output by the dynamic layout metadata provider 60 of FIG. 2), while any web application (e.g., corresponding to the web application and UI 26 of FIG. 2) associated with the UI display screen is running.

Note that method 80 may be modified, without departing from the scope of the present teachings. For example, the method 80 may further specify that the second step 84 further includes forwarding the description of the UI display screen to a real-time UI display screen generator (e.g., the generator 20 of FIG. 2).

The example method 80 may further specify that the real-time UI display screen generator includes code for employing the updated UI display screen description to generate markup and rendering instructions for a corresponding updated UI display screen.

Note that the layout software module (e.g., layout files implemented in JavaScript) may act as a layer of abstraction over one or more files containing metadata describing the updated UI display screen, wherein the layer of abstraction facilitates user control over appearance of the updated UI display screen.

The appearance of the updated UI display screen may be controlled, in part, by the layout software module, which specifies one or more UI layouts to apply to one or more sections of the UI display screen.

The second step 84 may further include selecting one or more sets of UI display screen layouts (e.g., styles) to apply to the one or more features in accordance with the one or more configurable rules. Code for the layout software module may be included in a dynamic layout file and may be implemented in JavaScript.

The one or more features may include one or more UI display screen components. The one or more UI display screen components may include one or more UI controls. The one or more UI display screen components include one or more UI display screen sections, which may correspond to a table, form, and/or other section.

The example method 80 may further include receiving, at the layout software module, metadata from a Swagger file. The metadata from the Swagger file may act as a plugin to the layout software module. The layout software module may include code for selectively accepting one or more portions of the metadata from the Swagger file. The metadata from the Swagger file may include viewer roles and associated privileges. The metadata from the Swagger file may further include a specification of one or more attributes of one or more UI controls of the updated UI display screen. The one or more UI controls may include, for example, a field of a table or form, and the one or more attributes may include a specification or description of a text format (e.g., text in "red" or age specified in "days").

The example method 80 may further specify that the metadata includes one or more of the following a specification of one or more business objects to represent via one or more sections of the updated UI display screen, the one or more sections including one or more forms or tables; a business object path for the one or more business objects, wherein the business object path indicates a use context for a business object in relation to one or more other business objects; a declaration of usage of the one or more business objects; a description of one or more viewer roles and associated privileges; one or more polymorphic variants of the one or more business objects in accordance with one or more predetermined data discriminants; and metadata obtained from a metadata service provider via a Swagger file or equivalent. The example method 80 may further include providing the metadata, contained in the updated UI display screen description, to a real-time UI display screen generator for generation of rendering instructions for the updated UI display screen.

A second example method includes receiving a first signal to access a first webpage that includes a UI display screen for a web application; serving the first webpage in response to the signal; detecting a change to configuration functionality associated with the first webpage, wherein the configuration functionality includes code provided in a dynamic layout file, the code includes one or more rules and specifications for configuring schema used to generate rendering instructions for the first webpage; and automatically updating the first webpage, resulting in an updated second webpage in response to the detecting of the change.

Figure 4A:
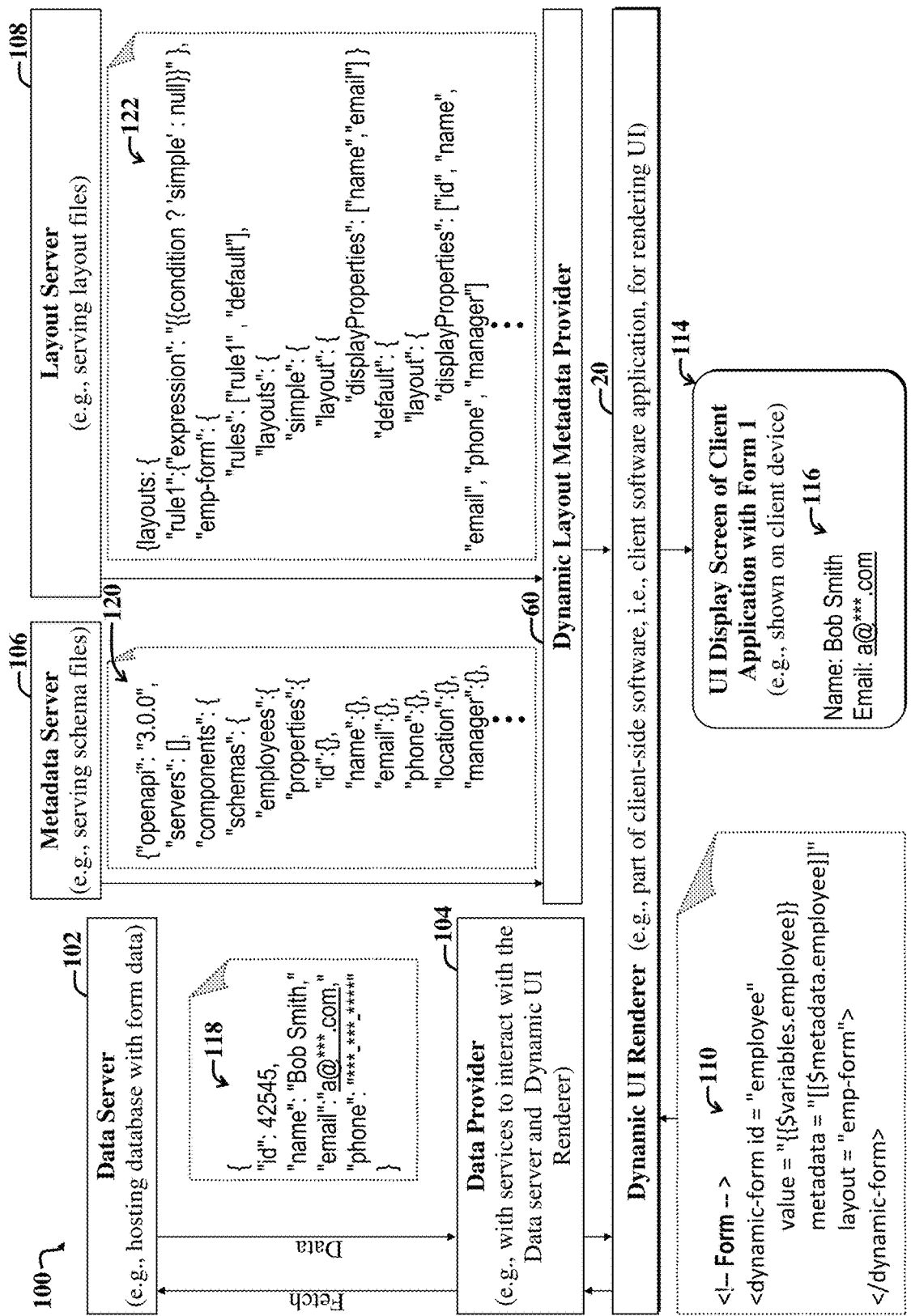
FIG. 4A is a block diagram of a second example system that further illustrates how an example dynamic form, an object with data to be used in the form, schema metadata pertaining to the object, and layout metadata (e.g., layout file) pertaining to the object can be combined to render a dynamic UI display screen.

FIG. 4A is a block diagram of a second example system 100 that further illustrates how an example dynamic form 110, an object 118 with data to be used in with a dynamic form specification 110, schema metadata (also called schema definition, or simply schema) 120 pertaining to the object 118, and layout metadata (e.g., layout file) 122 pertaining to the object 118 may be combined to render a dynamic UI display screen 114.

The resulting UI display screen 114 includes a displayed form 116 that conforms to the schema definition 120, layout metadata 122, and that selectively incorporates data of the object 118 in the form 116 in accordance with and consistent with the dynamic form specification 110.

The second example system 110 shows the dynamic UI renderer 20 receiving the dynamic form specification 110 as input. The dynamic form specification 110 specifies, for instance, the object 118 to be used to obtain data populate the form (e.g., the "employee" object); which schema file 120 to use, and which dynamic layout file 122 to use.

To obtain data for the form 110, the dynamic UI renderer 20 queries the data provider 104, which in turn queries the data server 102 to retrieve the employee object 118 for use by the dynamic UI render 20.

Before the form 116 is rendered in the UI display screen 114, the dynamic UI renderer 20 also retrieves the schema file 120 pertaining to the retrieved object 118, and the corresponding layout file 122, which may be retrieved (by the dynamic UI renderer 20) in combined form at the output of the dynamic layout metadata provider 60. Note that the layout file 122 includes a section for "emp-form," which is also identified in the dynamic form specification 110. Accordingly, the layout file 122 is said to point to the form specification 110 or vice versa.

The dynamic UI renderer 60 retrieves the schema 120 from a metadata server system 106 via the dynamic layout metadata provider 60. Similarly, dynamic UI renderer 20 retrieves the layout file 122 from a layout server system 108 via the dynamic layout metadata provider 60.

Note that with reference to FIGS. 2 and 4A, the metadata server system 106 of FIG. 4A is implemented via the dynamic layout provider 62 and dynamic layout service server 66 of FIG. 2. The metadata server system 106 of FIG. 4A is implemented via the service metadata provider 64 and schema REST server 68 of FIG. 2.

The dynamic layout metadata provider 60 of FIG. 4A includes code for selectively applying expressions, rules, display properties, and so on to data of the object 118 that is to be displayed (in the UI display screen 114) in accordance with the dynamic form specification 110.

Note that any adjustments that the layout file 122 makes to the display of an object, such as the object 118, must be consistent with the schema definition 120 of the object. For example, if the layout file 122 attempts to add "skills" to the default layout (specified near the bottom of the portion of the layout file 122 shown in FIG. 4A), and if the schema 120 does not account for a "skills" entry among an object of type "employee," (e.g., the object 118), then such a change will not be propagated to the UI display screen 114.

Figure 4B:
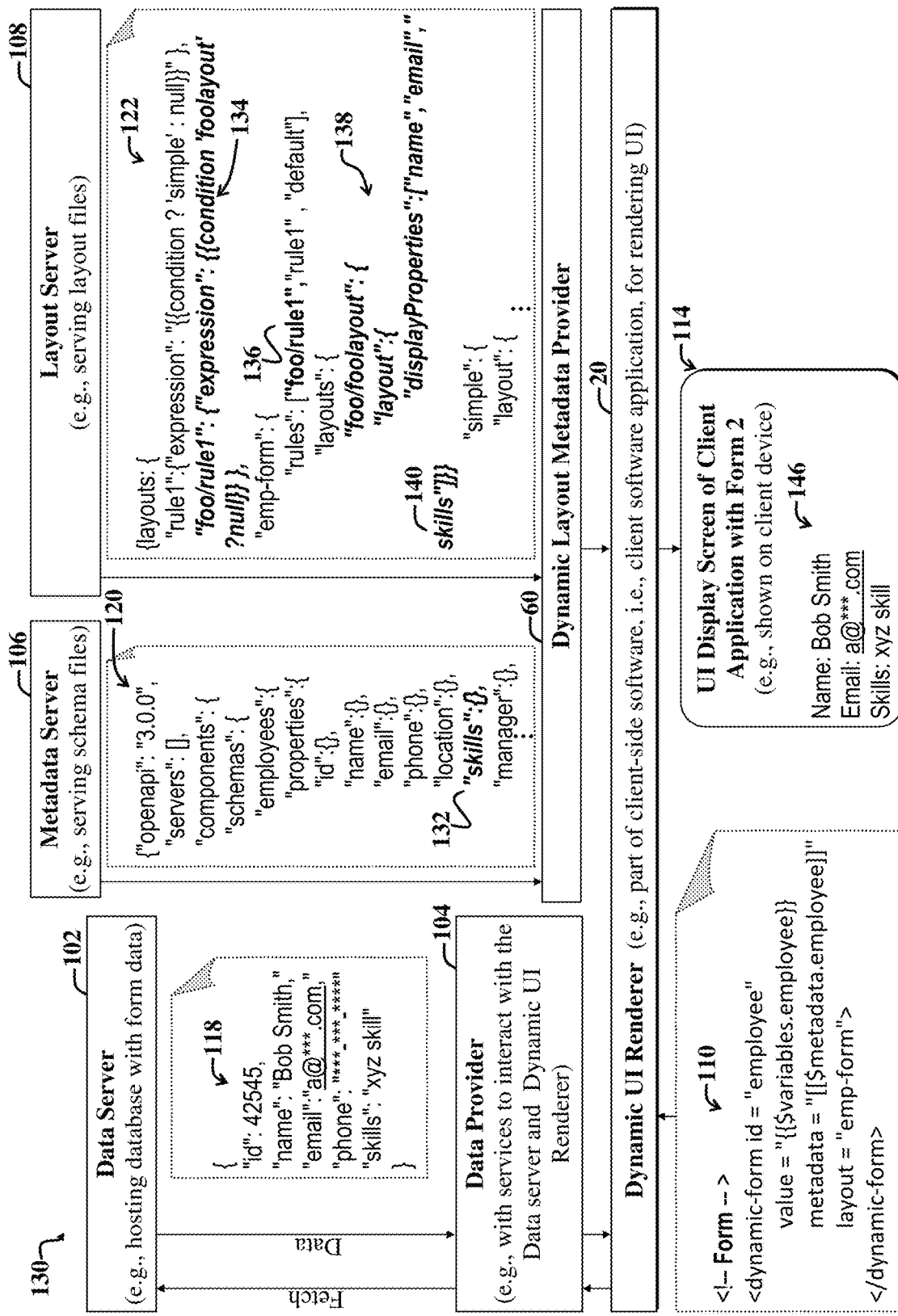
FIG. 4B shows the second example system of FIG. 4A after example customizations to a schema file and a layout file, including the addition of a rule to the layout file that specifies when to display additional data when a condition specified by the rule is met.

FIG. 4B shows the second example system 130 of FIG. 4A after example customizations to a schema file 120 and a layout file 122, including the addition of a rule 134-140 to the layout file 122 that specifies when to display additional data 140 when a condition 134 specified by the rule 136 is met.

In the present example scenario, a developer has updated the schema definition for an object of type "employee" (e.g., the example object 118) to include a row or field for "skills." This update is shown as an added "skills" entry 132 in the schema file 120. Subsequently, users interacting with the data server 102 may have updated the skills entry for the particular object 118. Any updated skills data for the object 118 may then be available to the dynamic UI renderer for subsequent rendering in accordance with the layout file 122.

Relative to FIG. 4A, the layout file 122 has been updated with a new rule (foo/rule1) that uses an expression to check a condition 134. Note that the code shown for the dynamic layout file 122 is pseudo code. In practice, the "expression" may be any number of supported expressions, and the condition may be any number of conditions. For example, the new "foo/rule1" may check that the logged in user is a manager, and the condition (of the expression) may specify that if the logged in user is a manager, then a special layout (called, e.g., the "foo/foolayout") is to be displayed, as specified via an added layout 138.

Other example conditions can be based on device display size, user location information, job role, or any other contextual information that is available to the system 130 and that may be evaluated and processed via the dynamic layout metadata provider 60 and/or dynamic UI renderer 20.

Note that in the present example scenario, the added layout 138 to be displayed when the rule 134 is met, includes the added skills information 140. The UI display screen 114 is then updated to display a dynamic form 146, which shows that "skills" have been added to the UI display screen 114, when the rule 136 and associated condition(s) 134 are met.

Note that, in the present example scenario, modifications the schema file 120 and layout file 122 were relatively simple modifications to metadata, which then efficiently resulted in propagated changes to the UI display screen 114. No changes to the specification of the dynamic form 110 were necessary. Furthermore, no changes to underlying source code of a process-based software application or other application were necessary.

Note that a given enterprise may modify their own layout files 122 and schema files 120 for a given enterprise application, without affecting other users of the underlying enterprise application. Accordingly, the layout file 122 may be considered as a configuration layer that rests on top of the schema layer, and both layers may rest on top of any underlying enterprise application source code.

Furthermore, note what while in the present example, the schema file 120 was updated to include a skills entry 132, that in practice, various types of changes may be made to the layout file 122 (which may then affect the resulting displayed form 146) without the need to modify the schema file 120. For example, the "foo/foolayout" 138 could have been modified to also display employee ID, location, etc., which are already specified in the schema file 120.

Figure 5:
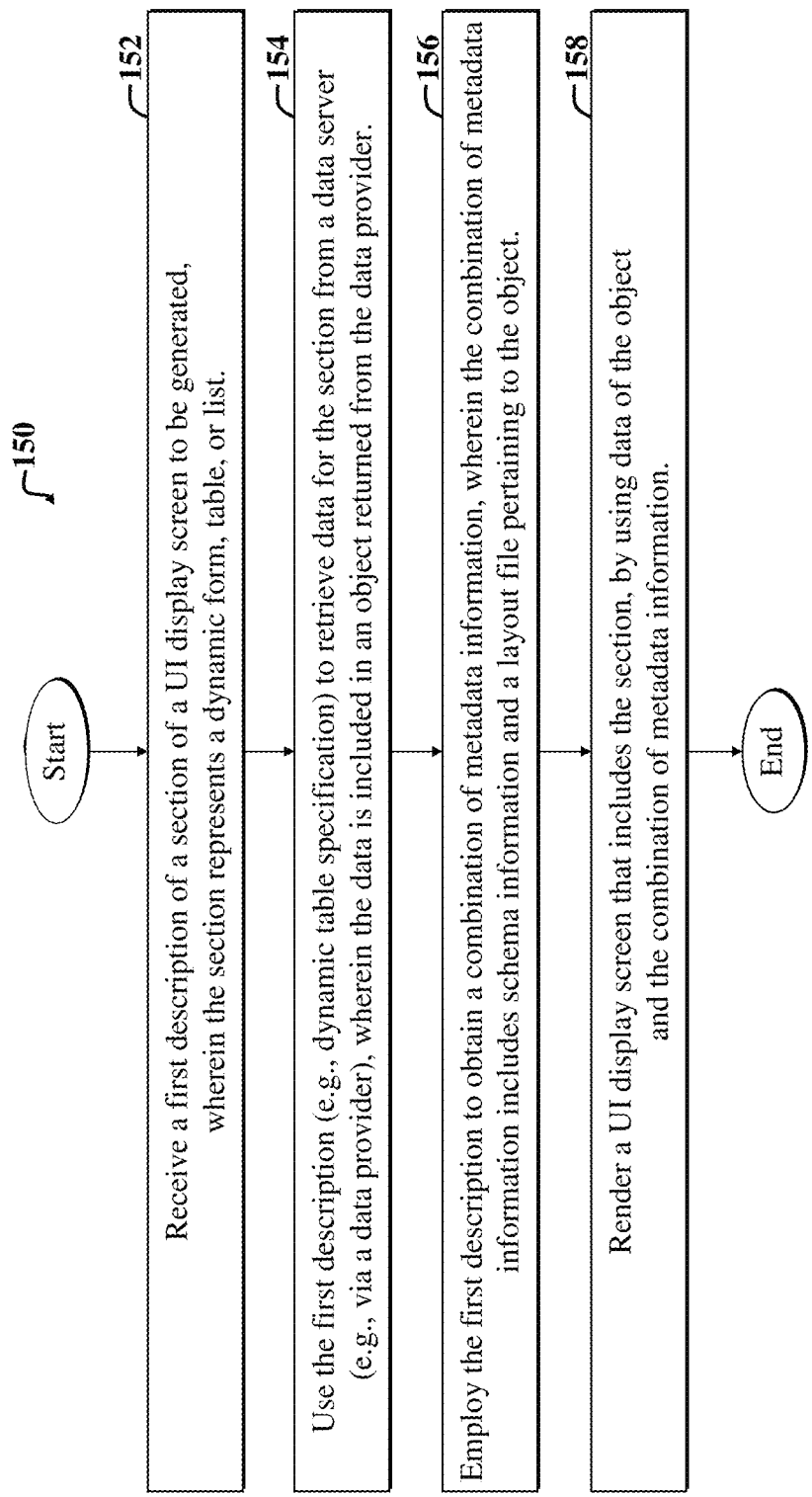
FIG. 5 is a flow diagram of a second example method that is suitable for use with the embodiments of FIGS. 1-4B.

FIG. 5 is a flow diagram of a second example method 150 that is suitable for use with the embodiments of FIGS. 1-4B. The second example method 150 facilitates rendering a UI display screen, which may include one or more dynamic forms, tables, lists, etc.

With reference to FIGS. 4B and 5, an initial receiving step 152 includes receiving a first description (e.g., corresponding to the dynamic form specification 110 of FIG. 4B) of a UI section (e.g., of a dynamic form 146) of a UI display screen (e.g., of the UI display screen 114 of FIG. 4B) to be generated. The UI section may represent a dynamic form, table, list, or other UI component.

Next, a description-using step 154 includes using the first description to retrieve data (e.g., corresponding to the data object 118 of FIG. 4B) for the section from a data server (e.g., the data server 102 of FIG. 4B) via a data provider (e.g., the data provider 104 of FIG. 4B), wherein the data is included in an object returned from the data provider.

Subsequently, an additional description-obtaining step 156 includes employing the first description to obtain a combination of metadata information, wherein the combination of metadata information includes schema information (e.g., corresponding to the schema file 120 of FIG. 4B) and a layout file (e.g., corresponding to the layout file 122 of FIG. 4B) pertaining to the object.

Next, a rendering step 158 includes rendering a UI display screen (e.g., the UI display screen 114 of FIG. 4B) that includes the UI section (e.g., the dynamic form 146 of FIG. 4B), using data of the object and the combination of metadata information (e.g., as output from the dynamic layout metadata provider 60 of FIG. 4B).

Note that second example method 150 may be modified, without departing from the scope of the present teachings. For example, the second example method 150 may further specify that the schema information includes or represents a definition of the object, including a specification of what attributes or fields the object may have; what order the fields must be in if the fields are included in an instance of an object consistent with the schema definition, and so on.

The first description (e.g., the dynamic form specification 110 of FIG. 4B) may represent a specification of a form, table, list, or other UI component or element (e.g., data visualization).

The additional description-obtaining step 156 may further specify using the first description to obtain a combination of metadata information, and further includes: determining if a condition of a rule (e.g., the rule and condition 134 of the layout file 122 of FIG. 4B) is met for display of the UI section (e.g., the dynamic form 146 of FIG. 4B), wherein the rule is included in a dynamic layout file pertaining to the form, table, or list pertaining to the object; and selecting a particular layout (e.g., "foo/foolayout" 138 of FIG. 4B) based on whether or not the condition is met. The condition is based on the job role of the logged in user; the device display size; user location, and/or other criteria.

Figure 6:
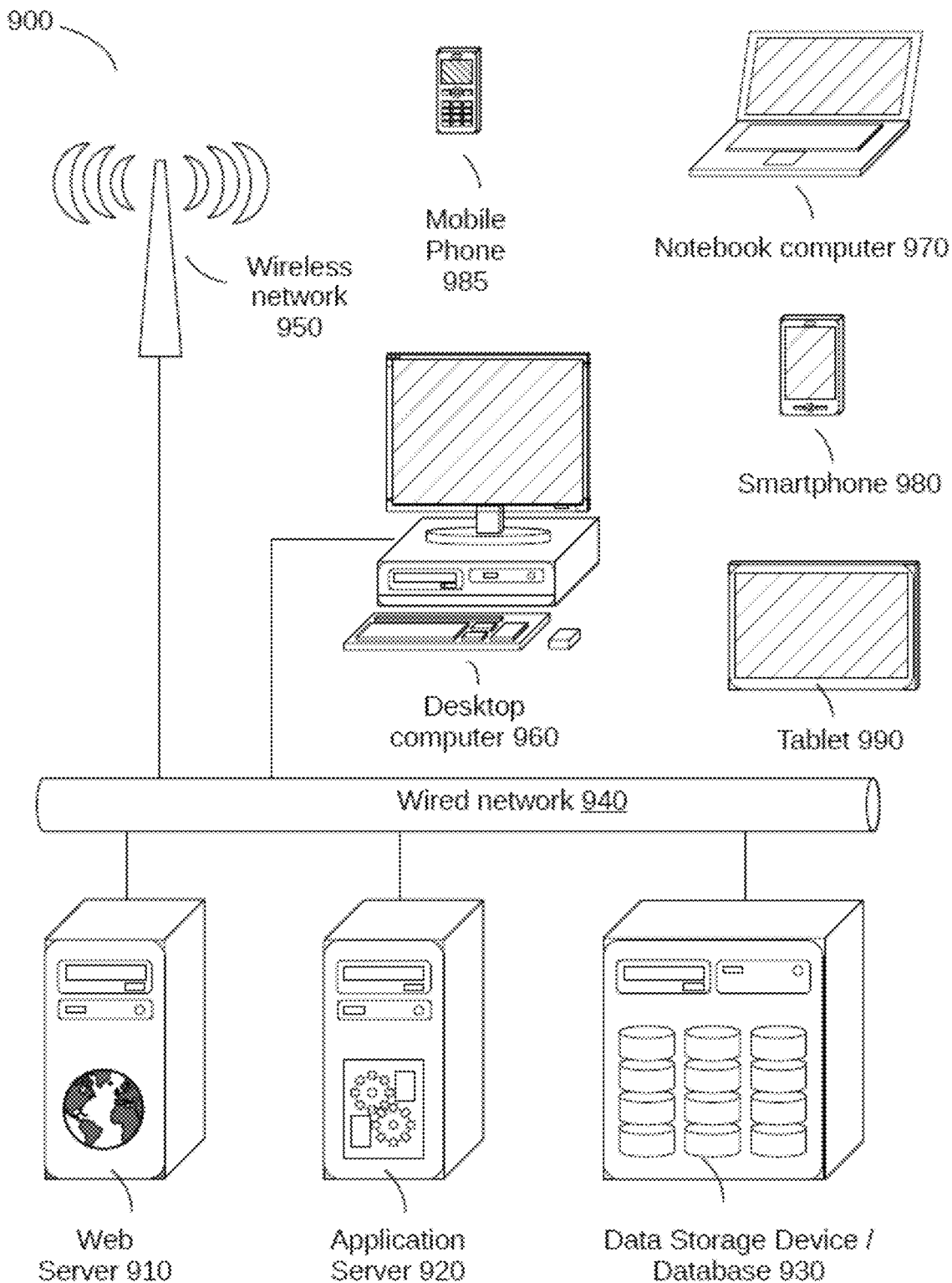
FIG. 6 is a general block diagram of a system and accompanying computing environment usable to implement the embodiments of FIGS. 1-5.

FIG. 6 is a general block diagram of a system 900 and accompanying computing environment usable to implement the embodiments of FIGS. 1-5. The example system 900 is capable of enabling efficient configuration and generation of dynamic UI display screens for web applications. Embodiments may be implemented as standalone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Figure 7:
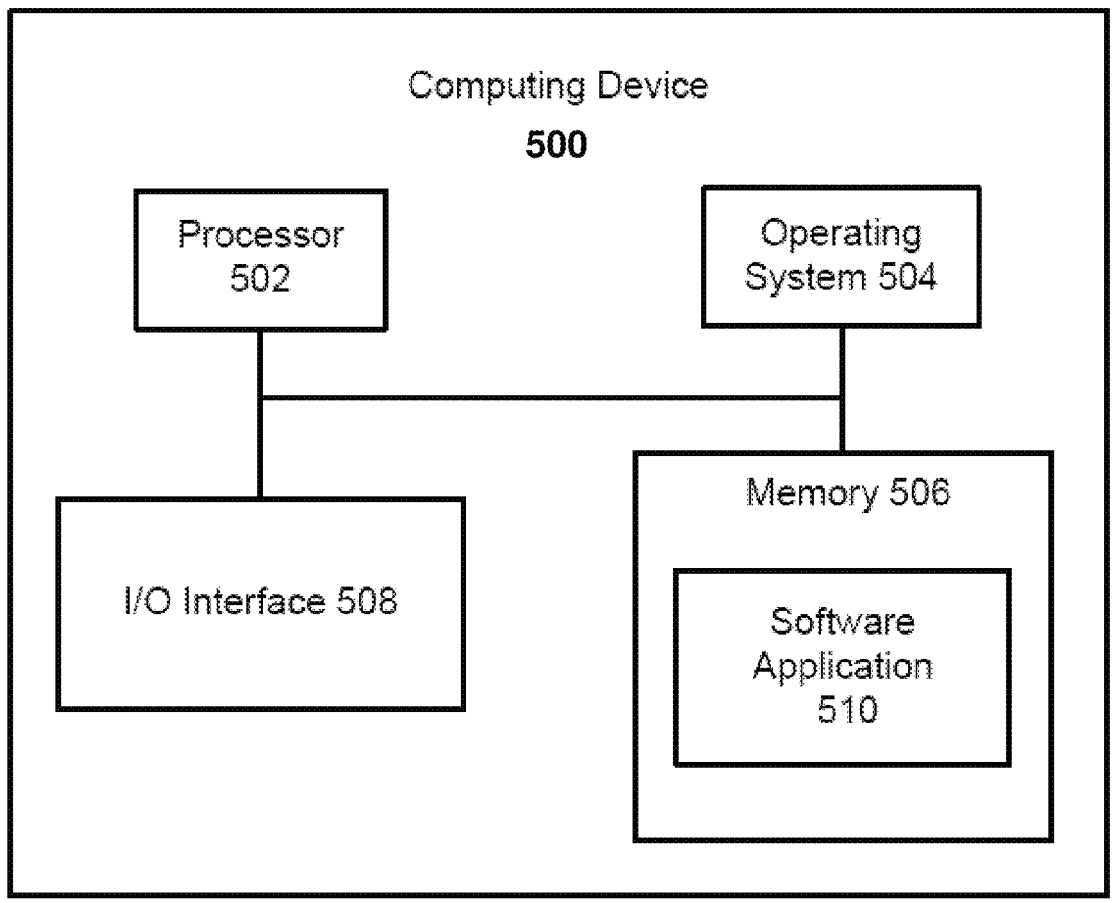
FIG. 7 is a general block diagram of a computing device usable to implement the embodiments of FIGS. 1-6.

FIG. 7 illustrates a block diagram of an example computing device 500, which may be used for implementations described herein. For example, computing device 500 may be used to implement server devices 910, 920 of FIG. 6 as well as to perform the method implementations described herein. In some implementations, computing device 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of system 500 or any suitable processor or processors associated with system 500 or any suitable system may perform the steps described. Implementations described herein may be carried out on a user device, on a server, or a combination of both.

Computing device 500 also includes a software application 510, which may be stored on memory 506 or on any other suitable storage location or computer-readable medium. Software application 510 provides instructions that enable processor 502 to perform the functions described herein and other functions. The components of computing device 500 may be implemented by one or more processors or any combination of hardware devices, as well as any combination of hardware, software, firmware, etc.

For ease of illustration, FIG. 7 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computing device 500 may not have all of the components shown and/or may have other elements including other types of components instead of, or in addition to, those shown herein.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a tangible medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means. An example apparatus for facilitating configuration of a User Interface (UI) model and associated dynamic UI display screens for a web application comprises: means for receiving metadata describing one or more features of a UI display screen to be generated; means for using a layout software module to determine and configure the UI display screen in accordance with the metadata and one or more configurable rules set forth in the layout software module, resulting in a description of the UI display screen, the description sufficient to generate the UI display screen; means for receiving an adjustment to code of the layout software module; and means for automatically adjusting the description of the UI display screen at runtime, resulting in an updated UI display screen description, while a web application using the UI display screen is running.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

Although the description has been described with respect to particular embodiments thereof, these particular embodiments are merely illustrative, and not restrictive. For example, while various embodiments are discussed as employing JavaScript implementation of dynamic layout files for characterizing UI display screens for web applications, embodiments are not limited thereto. Those skilled in the art will appreciate that other suitable technologies may be used in place of JavaScript, and that embodiments may apply to configuration and implementation of UI display screens that are not necessarily part of or used by web applications.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A non-transitory tangible processor-readable medium including instructions executable by one or more processors, and when executed operable for:
   receiving, by a remote computer device, layout metadata from a first server resource and schema metadata from a second Representational State Transfer (REST) server resource, describing one or more features of a User Interface (UI) display screen to be generated;
   attaching namespace files of the layout metadata and the schema metadata to prevent extension files with similar names;
   using a layout software module to determine and configure the UI display screen in accordance with the layout metadata and the schema metadata, and one or more configurable rules set forth in the layout software module by selectively combining the layout metadata and the schema metadata, wherein the layout software module includes code to accept one or more select portions of the schema metadata from a schema file as a plugin, resulting in a combined description of the UI display screen, the combined description sufficient to generate the UI display screen populated with data from one or more objects;
   providing the combined description to a client device to render the UI display screen according to the combined description;
   receiving a first adjustment to code of the layout software module to make a first alteration of at least one object of the one or more objects and a second adjustment to code of the layout software module to make a second alteration of the at least one object;
   determining that the first alteration is consistent with a schema definition of the at least one object and the second alteration is inconsistent with the schema definition of the at least one object;
   in response to determining the consistency of the first alteration, automatically adjusting the combined description of the UI display screen provided to the client device at runtime according to the first alteration, by signaling the client device to refresh the UI display screen, resulting in an updated combined description, while a web application using the UI display screen is running; and
   in response to determining the inconsistency of the second alteration, refraining from propagating the second alteration to the UI display screen.

2. The non-transitory tangible processor-readable medium of claim 1, wherein using the layout software module to determine and configure the UI display screen further includes forwarding the updated combined description to a real-time UI display screen generator, and
   wherein the real-time UI display screen generator includes code for employing the updated combined description to generate markup and rendering instructions for a corresponding updated UI display screen.

3. The non-transitory tangible processor-readable medium of claim 2, wherein the instructions, when executed are further operable for supplying the markup and rendering instructions to a client software application, thereby enabling access to the updated UI display screen via one or more client devices.

4. The non-transitory tangible processor-readable medium of claim 1, wherein the layout software module acts as a layer of abstraction over one or more files containing metadata describing an updated UI display screen associated with the updated combined description, wherein the layer of abstraction facilitates user control over appearance of the updated UI display screen.

5. The non-transitory tangible processor-readable medium of claim 4, wherein the appearance of the updated UI display screen is controlled, in part, by the layout software module, which specifies one or more UI layouts to apply to one or more sections of the UI display screen.

6. The non-transitory tangible processor-readable medium of claim 1, wherein using further includes selecting one or more sets of UI display screen layouts to apply to the one or more features of the UI display screen in accordance with the one or more configurable rules.

7. The non-transitory tangible processor-readable medium of claim 1, wherein code for the layout software module is included in a dynamic layout file, and wherein the code includes JavaScript and the first adjustment to the code and the second adjustment to the code include adjustments of the JavaScript.

8. The non-transitory tangible processor-readable medium of claim 7, wherein the one or more features include one or more UI display screen components, wherein the one or more UI display screen components include one or more UI display screen sections, and wherein the one or more UI display screen sections include a dynamic form.

9. The non-transitory tangible processor-readable medium of claim 1, wherein the first alteration includes an entry change to a display of the at least one object that is different from an entry change of the display of the at least one object included by the second alteration.

10. A method for facilitating configuration of a User Interface (UI) model and associated dynamic UI display screens for a web application, the method comprising:
- receiving, by a remote computer device, layout metadata from a first server resource and schema metadata from a second Representational State Transfer (REST) server resource, describing one or more features of a UI display screen to be generated;
- attaching namespace files of the layout metadata and the schema metadata to prevent extension files with similar names;
- using a layout software module to determine and configure the UI display screen in accordance with the layout metadata and the schema metadata, and one or more configurable rules set forth in the layout software module by selectively combining the layout metadata and the schema metadata, wherein the layout software module includes code to accept one or more select portions of the schema metadata from a schema file as a plugin, resulting in a combined description of the UI display screen, the combined description sufficient to generate the UI display screen populated with data from one or more objects;
- providing the combined description to a client device to render the UI display screen according to the combined description;
- receiving a first adjustment to code of the layout software module to make a first alteration of at least one object of the one or more objects and a second adjustment to code of the layout software module to make a second alteration of the at least one object;
- determining that the first alteration is consistent, with a schema definition of the at least one object and the second alteration is inconsistent with the schema definition of the at least one object;
- in response to determining the consistency of the first alteration, automatically adjusting the combined description of the UI display screen provided to the client device at runtime according to the first alteration, by signaling the client device to refresh the UI display screen, resulting in an updated combined description, while a web application using the UI display screen is running; and
- in response to determining the inconsistency of the second alteration, refraining from propagating the second alteration to the UI display screen.

11. The method of claim 10, wherein using the layout software module to determine and configure the UI display screen further includes forwarding the updated combined description to a real-time UI display screen generator, and wherein the real-time UI display screen generator includes code for employing the updated combined description to generate markup and rendering instructions for a corresponding updated UI display screen.

12. The method of claim 11, further including supplying the markup and rendering instructions to a client software application, thereby enabling access to the updated UI display screen via one or more client devices.

13. The method of claim 10, wherein the layout software module acts as a layer of abstraction over one or more files containing metadata describing an updated UI display screen associated with the updated combined description, wherein the layer of abstraction facilitates user control over appearance of the updated UI display screen.

14. The method of claim 13, wherein the appearance of the updated UI display screen is controlled, in part, by the layout software module, which specifies one or more UI layouts to apply to one or more sections of the UI display screen.

15. The method of claim 10, wherein using further includes selecting one or more sets of UI display screen layouts to apply to the one or more features of the UI display screen in accordance with the one or more configurable rules.

16. The method of claim 10, wherein code for the layout software module is included in a dynamic layout file, and wherein the code includes JavaScript, and wherein the one or more features include one or more dynamic forms, tables, or lists.

17. The method of claim 10, wherein the first alteration includes an entry change to a display of the at least one object that is different from an entry change of the display of the at least one object included by the second alteration.

18. An apparatus comprising:
- one or more processors; and
  - logic encoded in one or more tangible media for execution by the one or more processors and when executed operable for:
- receiving, by a remote computer device, layout metadata from a first server resource and schema metadata from a second Representational State Transfer (REST) server resource, describing one or more features of a User Interface (UI) display screen to be generated;
- attaching namespace files of the layout metadata and the schema metadata to prevent extension files with similar names;
- using a layout software module to determine and configure the UI display screen in accordance with the layout metadata and the schema metadata, and one or more configurable rules set forth in the layout software module by selectively combining the layout metadata and the schema metadata, wherein the layout software module includes code to accept one or more select portions of the schema metadata from a schema file as a plugin, resulting in a combined description of the UI display screen, the combined description sufficient to generate the UI display screen populated with data from one or more objects;
- providing the combined description to a client device to render the UI display screen according to the combined description;
- receiving a first adjustment to code of the layout software module to make a first alteration of at least one object of the one or more objects and a second adjustment to code of the layout software module to make a second alteration of the at least one object;
- determining that the first alteration is consistent with a schema definition of the at least one object and the second alteration is inconsistent with the schema definition of the at least one object;
- in response to determining the consistency of the first alteration, automatically adjusting the combined description of the UI display screen provided to the client device at runtime according to the first alteration, by signaling the client device to refresh the UI display screen, resulting in an updated combined description, while a web application using the UI display screen is running; and
- in response to determining the inconsistency of the second alteration, refraining from propagating the second alteration to the UI display screen.

19. The apparatus of claim 18, wherein using further includes forwarding the updated combined description to a real-time UI display screen generator, and
 wherein the real-time UI display screen generator includes code for employing the updated combined description to generate markup and rendering instructions for a corresponding updated UI display screen.

20. The apparatus of claim 18, further including supplying the markup and rendering instructions to a client software application, thereby enabling access to the updated UI display screen via one or more client devices.

21. The apparatus of claim 18, wherein the layout software module acts as a layer of abstraction over one or more files containing metadata describing an updated UI display screen associated with the updated combined description, wherein the layer of abstraction facilitates user control over appearance of the updated UI display screen.

22. The apparatus of claim 18, wherein the appearance of the updated UI display screen is controlled, in part, by the layout software module, which specifies one or more UI layouts to apply to one or more sections of the UI display screen.

23. The apparatus of claim 18, wherein using further includes selecting one or more sets of UI display screen layouts to apply to the one or more features of the UI display screen in accordance with the one or more configurable rules.

24. The apparatus of claim 18, wherein code for the layout software module is included in a dynamic layout file, and wherein the code includes JavaScript, and wherein the one or more features include one or more dynamic forms, tables, or lists.

25. The apparatus of claim 18, wherein the first alteration includes an entry change to a display of the at least one object that is different from an entry change of the display of the at least one object included by the second alteration.

* * * * *